United States Patent
Nishikawa et al.

(10) Patent No.: US 7,456,984 B2
(45) Date of Patent: Nov. 25, 2008

(54) BILLING CONTROL IN PRINT SYSTEM

(75) Inventors: Satoshi Nishikawa, Kanagawa (JP); Junichiro Kizaki, Kanagawa (JP); Yasuo Mori, Kanagawa (JP); Junko Sato, Kanagawa (JP); Takuya Miyazato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 943 days.

(21) Appl. No.: 10/735,839

(22) Filed: Dec. 16, 2003

(65) Prior Publication Data

US 2004/0125407 A1 Jul. 1, 2004

(30) Foreign Application Priority Data

Dec. 20, 2002 (JP) ............................. 2002-371002

(51) Int. Cl.
*G06F 15/00* (2006.01)
*G03G 15/00* (2006.01)

(52) U.S. Cl. ..................................... 358/1.14; 399/382

(58) Field of Classification Search ................ 358/1.14, 358/1.18, 474, 444, 1.17, 1.16, 443, 464; 101/216, 248, 486; 399/16, 76, 382, 364, 399/383, 363; 705/39–40; 715/526

See application file for complete search history.

(56) References Cited

U.S. PATENT DOCUMENTS 7,009,728 B1 * 3/2006 Hara et al. .................. 358/1.16
2005/0060650 A1 * 3/2005 Ryan et al. .................. 715/526

* cited by examiner

*Primary Examiner*—Saeid Ebrahimi Dehkordy
(74) *Attorney, Agent, or Firm*—Fitzpatrick, Cella, Harper & Scinto

(57) ABSTRACT

This invention has as its object to allow a print system having a middle insert print function to insert an index sheet without billing for it. According to a preferred embodiment, when it is set to insert an index sheet, a print application (305) executes a non-billing command transmission preparation process (step S603). Upon completion of the preparation process, the print application transmits a non-billing command to a printer (step S604). The print application then executes an index sheet output process (step S606). The printer excludes the index sheet from sheets to be billed in accordance with the received non-billing command.

14 Claims, 13 Drawing Sheets

F I G. 10
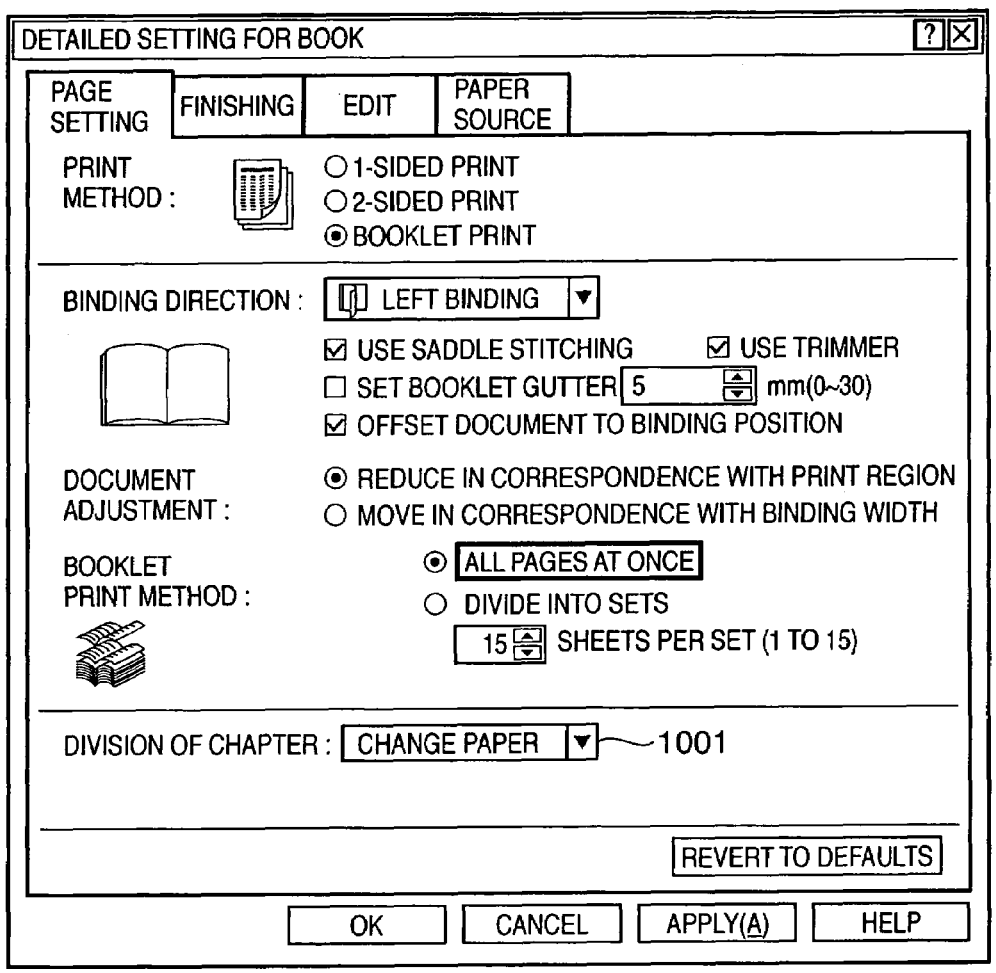

FIG. 11

```
PRINT SETUP
    |-- PRINT SETUP EFFECTIVE FOR ENTIRE DOCUMENT
        |-- PRINT SETUP EFFECTIVE FOR BUNDLE OF SHEETS
            |-- PRINT SETUP EFFECTIVE FOR SHEET
                |-- PRINT SETUP EFFECTIVE FOR PHYSICAL PAGE
            |-- PRINT SETUP EFFECTIVE FOR SHEET
            |-- PRINT SETUP EFFECTIVE FOR SHEET
        |-- PRINT SETUP EFFECTIVE FOR BUNDLE OF SHEETS
            |-- PRINT SETUP EFFECTIVE FOR SHEET
            |-- PRINT SETUP EFFECTIVE FOR SHEET
            |-- PRINT SETUP EFFECTIVE FOR SHEET
```

FIG. 12

```
PRINT SETUP
    |-- PRINT SETUP EFFECTIVE FOR ENTIRE DOCUMENT
        |-- PRINT SETUP EFFECTIVE FOR BUNDLE OF SHEETS
            |-- PRINT SETUP EFFECTIVE FOR SHEET
                |-- PRINT SETUP EFFECTIVE FOR PHYSICAL PAGE
                         :
                    BLANK SHEET NON-BILLING SETUP
            |-- PRINT SETUP EFFECTIVE FOR SHEET
        |-- PRINT SETUP EFFECTIVE FOR BUNDLE OF SHEETS
            |-- PRINT SETUP EFFECTIVE FOR SHEET
            |-- PRINT SETUP EFFECTIVE FOR SHEET
            |-- PRINT SETUP EFFECTIVE FOR SHEET
```

FIG. 13

LIPS COMMAND EXPANSION EXAMPLE

PRINT FACE DESIGNATION COMMAND (CONVENTIONAL COMMAND) PARAMETER 10: INSERT BLANK SHEET (HIDDEN) ← ADD

DATA THAT FOLLOWS THIS COMMAND IS PRINTED FROM NEXT SHEET AFTER BLANK SHEET INCLUDING CURRENT PAGE IS INSERTED

BILLING CONTROL IN PRINT SYSTEM

FIELD OF THE INVENTION

The present invention relates to a billing control technique in a print system.

BACKGROUND OF THE INVENTION

Conventionally, a counter for counting the number of paper sheets output from a printer is provided to that printer to bill an amount corresponding to the count value.

An application having a so-called middle insertion print function that inserts (middle-inserts) an index sheet or inserting sheet at predetermined division positions (e.g., at the end of each chapter or the like) upon printing a multi-page document has been developed.

When data generated by the application with such middle insert print function is to be printed, if the conventional process is done, the user is also billed for an index sheet. However, it may sometimes be unreasonable to bill for such index sheet counted by the counter although the index sheet is merely output onto an output tray without printing any data on it.

Also, a scheme that checks in a printer driver if a page of interest is a blank page, and inserts a predetermined command (e.g., inserts a paper size change command without any paper discharge command after paper feeding) to inhibit the printer to bill for that blank page if that page is a blank page has been proposed. However, the independent judgement of the printer driver may lead to misjudgment, and such process is often not preferable.

SUMMARY OF THE INVENTION

It is the first object of the present invention to provide a scheme that can instruct a printer driver to control a printer not to bill for a blank page in an application.

It is the second object of the present invention to allow a print system having a middle insert print function to insert an index sheet without billing for it.

According to one aspect of the present invention, preferably, a method of controlling an information processing apparatus which supplies print data to a printer, comprises: a determination step of determining whether or not a document includes a page which is not printed by the printer; a print setting structure output step of outputting, when it is determined in the determination step that the document includes a page which is not printed by the printer, a print setting structure that instructs to set a non-billing page to rendering means of an OS; and a print data generation step of generating, when the print setting structure that instructs to set a non-billing page is received via the rendering means of the OS, a non-billing command.

According to another aspect of the present invention, preferably, a method of controlling an information processing apparatus that supplies print data to a printer which comprises middle insert means for inserting an independently fed index sheet between printed print sheets upon printing and exhausting print sheets, comprises: a setting step of setting whether or not an index sheet is to be inserted; and an instruction step of instructing, when it is set in the setting step that the index sheet is to be inserted, the printer to exclude the index sheet to be inserted from sheets to be billed.

According to still another aspect of the present invention, preferably, a print system having a printer which comprises middle insert means for inserting an independently fed index sheet between printed print sheets upon printing and exhausting print sheets, and a host computer connected to the printer, the host computer comprises: setting means for setting whether or not an index sheet is to be inserted; and instruction means for, when the setting means sets that the index sheet is to be inserted, instructing the printer to exclude the index sheet to be inserted from sheets to be billed, and the printer comprises: count means for counting the number of printed sheets for the purpose of billing; and control means for controlling a count operation of the count means on the basis of an instruction from the instruction means.

According to still another aspect of the present invention, preferably, a method of controlling an information processing apparatus that supplies print data to a printer which comprises 2-sided print means for forming images on two faces of a print sheet and exhausting the printed print sheet, comprises: a setting step of setting whether or not a blank sheet is to be inserted at a predetermined division position; and an instruction step of instructing, when it is set in the setting step that the blank sheet is to be inserted, the printer to exclude the blank sheet to be inserted from sheets to be billed.

According to another aspect of the present invention, preferably, a print system which has a printer which comprises 2-sided print means for forming images on two faces of a print sheet and exhausting the printed print sheet, and a host computer connected to the printer, the host computer comprises: setting means for setting whether or not a blank sheet is to be inserted at a predetermined division position; and instruction means for, when the setting means sets that the blank sheet is to be inserted, instructing the printer to exclude the blank sheet to be inserted from sheets to be billed, and the printer comprises: count means for counting the number of printed sheets for the purpose of billing; and control means for controlling a count operation of the count means on the basis of an instruction from the instruction means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 10 shows a setting window associated with a spool file in the embodiment;

FIG. 11 shows an example of the configuration of a despool table in the embodiment;

FIG. 12 shows a recording example of non-billing information in the despool table in the embodiment; and FIG. 13 shows a description example of a non-billing command.

DETAILED DESCRIPTION OF THE PREFERRED EMBODIMENTS

Preferred embodiments of the present invention will now be described in detail in accordance with the accompanying drawings.

Figure 1:
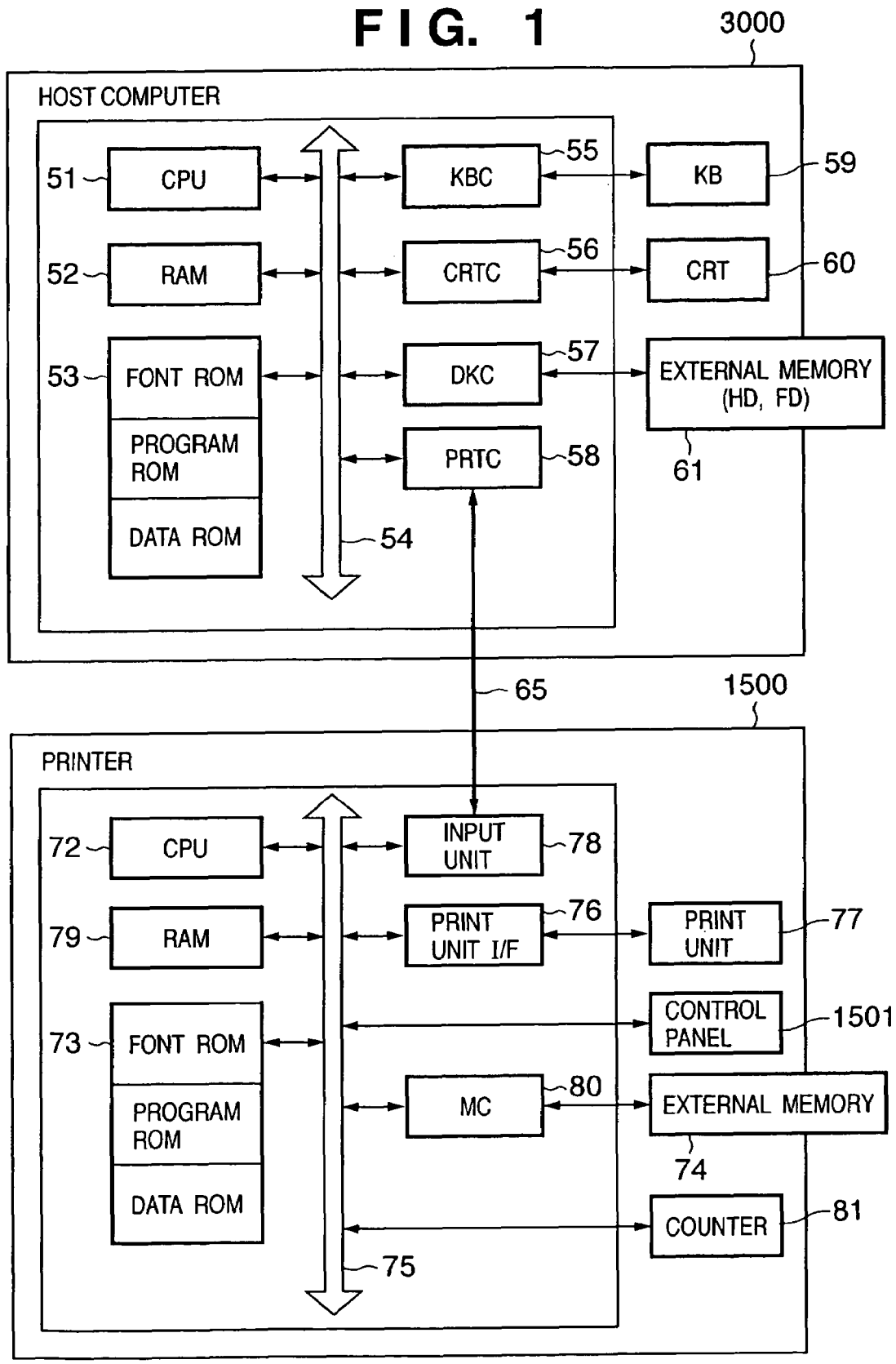
FIG. 1 is a block diagram showing the arrangement of a print system according to an embodiment of the present invention.

FIG. 1 is a block diagram showing the arrangement of a print system according to an embodiment of the present invention.

Referring to FIG. 1, a host computer 3000 comprises a CPU 51 which executes a document process including graphic data, image data, text data, and table data (including spreadsheet data or the like) together on the basis of a document processing program stored in a program ROM of a ROM 53 or an external memory 61. The CPU 51 systematically controls devices connected to a system bus 54. The program ROM of the ROM 53 or the external memory 61 stores an operating system program (to be referred to as an OS hereinafter) and the like as a control program of the CPU 51. A font ROM of the ROM 53 or the external memory 61 stores font data and the like used in the document process. A data ROM of the ROM 53 or the external memory 61 stores various data used upon executing the document process and the like. A RAM 52 serves as a main memory, work area, and the like of the CPU 51.

A keyboard controller (KBC) 55 controls key inputs from a keyboard 59 and a pointing device (not shown). A CRT controller (CRTC) 56 controls display on a CRT display (CRT) 60. A disk controller (DKC) 57 controls access to the external memory 61 such as a hard disk (HD), flexible disk (FD), and the like, which stores a boot program, various applications, font data, user files, edit files, a printer control command generation program (to be referred to as a printer driver hereinafter), and the like. A printer controller (PRTC) 58 is connected to a printer 1500 via a two-way interface 65, and executes a communication control process with the printer 1500.

Note that the CPU 51 executes an outline font rasterize process onto a display information RAM assured on, e.g., the RAM 52, thus allowing WYSIWYG on the CRT 60. Also, the CPU 51 opens various registered windows on the basis of commands designated by a mouse cursor (not shown) or the like on the CRT 60, and executes various data processes. Upon executing a print process, the user opens a window that pertains to print setups, and can make setups of a print process method for the printer driver, which includes printer setups and print mode selection.

The printer 1500 is controlled by a CPU 72. The CPU 72 outputs an image signal as output information to a print unit (printer engine) 77 connected to a system bus 75 on the basis of a control program and the like stored in a program ROM of a ROM 73 or a control program and the like stored in an external memory 74. The program ROM of the ROM 73 stores a control program and the like of the CPU 72. A font ROM of the ROM 73 stores font data and the like used upon generating the output information. A data ROM of the ROM 73 stores information and the like used on the host computer in case of a printer which does not have any external memory 74 such as a hard disk or the like.

The CPU 72 can execute a communication process with the host computer via an input unit 78, and can inform the host computer 3000 of information in the printer and the like. A RAM 79 serves as a main memory, work area, and the like of the CPU 72, and its memory size can be expanded by an option RAM connected to an expansion port (not shown). Note that the RAM 79 is used as an output information rasterize area, environment data storage area, NVRAM, and the like. A memory controller (MC) 80 controls access to the external memory 74 such as a hard disk (HD), IC card, or the like. The external memory 74 is connected as an option, and stores font data, an emulation program, form data, and the like. Reference numeral 1501 denotes a control panel on which operation switches, LED indicators, and the like are arranged.

This printer 1500 comprises a counter 81 for counting printed sheets for the purpose of billing. The count operation of this counter 81 can be controlled by the CPU 72.

The number of external memories 74 is not limited to one, and a plurality of external memories 74 may be connected. That is, option cards and external memories that store programs used to interpret printer control languages of different language systems in addition to internal font data may be connected. Furthermore, an NVRAM (not shown) may be connected, and may store printer mode setup information from the control panel 1501.

Figure 2:
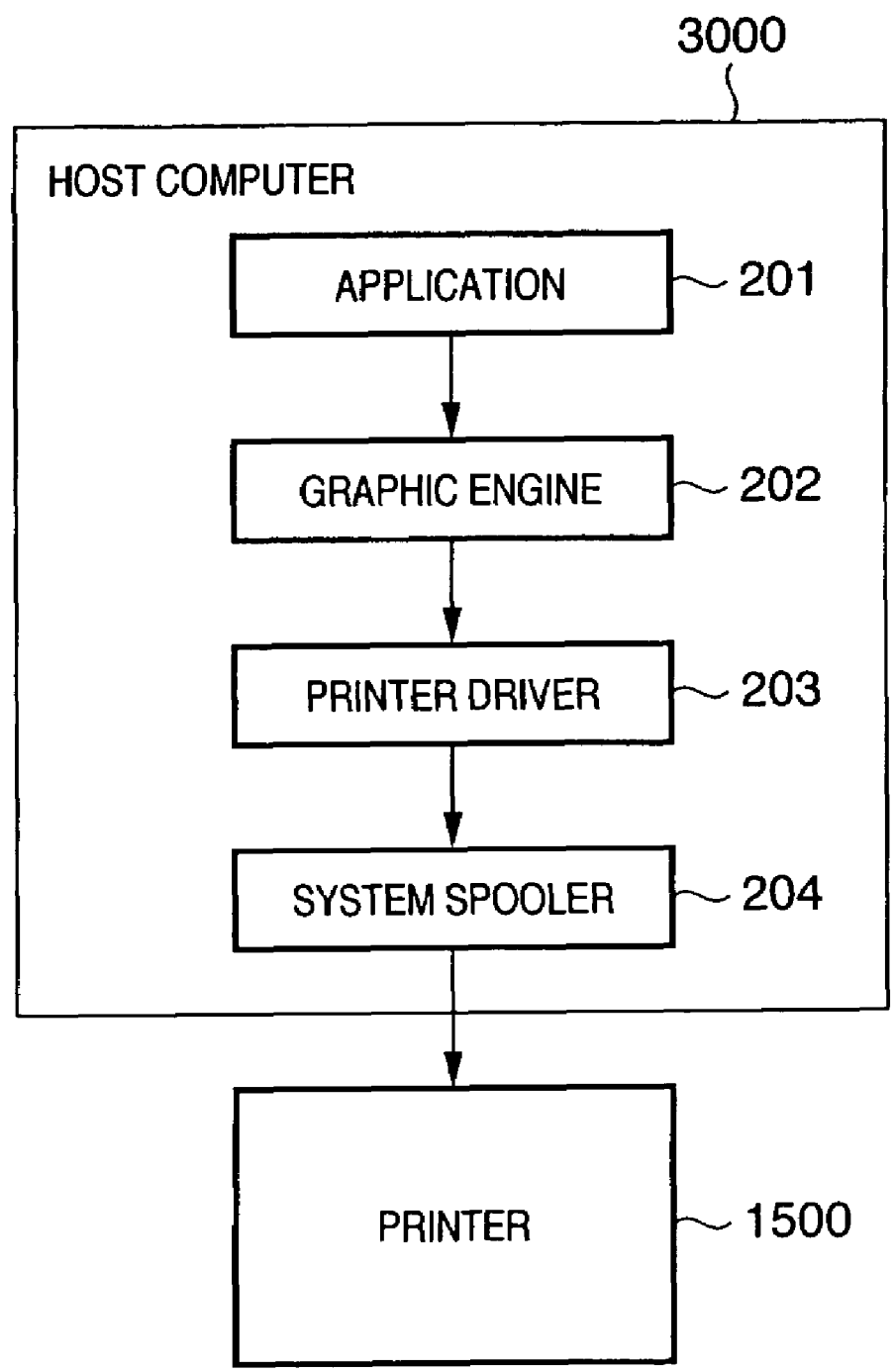
FIG. 2 is a block diagram showing the software configuration associated with a print process of the print system of the embodiment.

FIG. 2 is a block diagram showing the software configuration associated with a print process of the print system of this embodiment.

In the host computer 3000, an application 201, graphic engine 202, printer driver 203, and system spooler 204 are program modules, which are saved in the external memory 61, are loaded onto the RAM 52 in response to an instruction from the OS or another program which exploits that program, and are executed by the CPU 51. The application 201 and printer driver 203 can be added to the HD of the external memory 61 via the FD of the external memory 61, a CD-ROM (not shown), or a network (not shown). The application 201 saved in the external memory 61 is loaded onto the RAM 52 upon execution. When this application 201 issues a print command to the printer 1500, an output (rendering) process is executed using the graphic engine 202 which is similarly loaded onto the RAM 52 and is ready to execute.

The graphic engine 202 (corresponding to rendering means of the OS called GDI in the Windows OS (the registered trademark of Microsoft Corporation) similarly loads the printer driver 203 prepared for the printer 1500 from the external memory 61 onto the RAM 52, and sets an output from the application 201 in the printer driver 203. The graphic engine 202 converts a GDI (Graphic Device Interface) function received from the application 201 into a DDI (Device Driver Interface) function, and outputs the DDI function to the printer driver 203. The printer driver 203 converts the DDI function received from the graphic engine 202 into a control command that the printer can interpret, e.g., PDL (Page Description Language) data. The converted printer control command is output as print data to the printer 1500 via the system spooler 204 loaded onto the RAM 52 by the OS and the interface 65.

Figure 3:
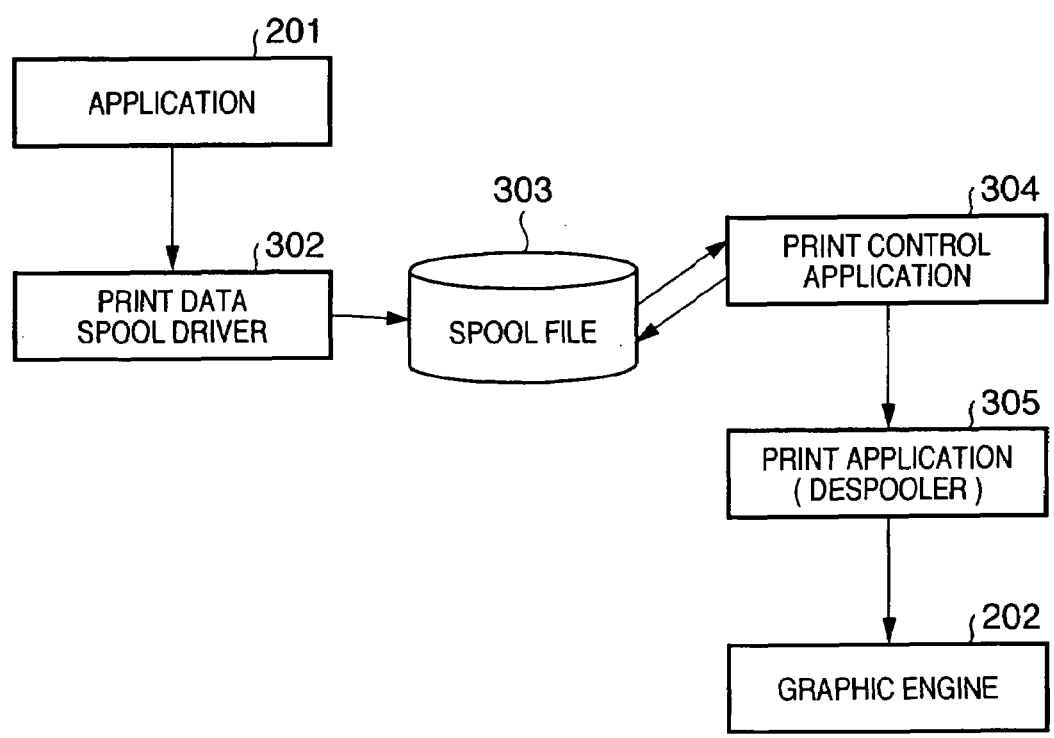
FIG. 3 is a block diagram showing the software configuration associated with spooling of intermediate code data in the print system of the embodiment.

The print system of this embodiment further has an arrangement for spooling print data from the application 201 as intermediate code data. FIG. 3 is a block diagram showing the software configuration associated with spooling of such intermediate code data.

Referring to FIG. 3, print data from the application 201 is saved (spooled) in the external memory 61 as a spool file 303 in an intermediate data format via a print data spooling driver 302. The spool file 303 includes contents data, print setting data, and the like of a print. Note that the contents data of a print is an intermediate code of data which is created by the user on the application 201, and the print setting data is data that describes how to output the contents data (output style and the like).

A print control application 304 loads this spool file 303. This application can change, display, and spool the output style of the loaded spool file 303, and can output a print command. A print application (despooler) 305 makes an actual print operation. Upon reception of a print command from the print control application 304, the print application (spooler) 305 sends an output instruction to the graphic engine 202 in accordance with the output style set by the print control application 304. As a result, the printer driver 203 generates a printer control command in, e.g., a page description language on the basis of the DDI function acquired from the graphic engine 202, and outputs it to the printer 1500 via the system spooler 204.

The print control application 304 can change the contents of print data by processing the spool file 303 in the intermediate code format. As a result, functions such as an enlargement/reduction function, a function of printing a plurality of pages on one page in a reduced scale, and the like, that the application does not have can be implemented for print data from the application 201. In general, the user makes setups from a window of a user interface (UI) provided by the print control application 304, which saves the setup contents on the RAM 52 or external memory 61.

Figure 4:
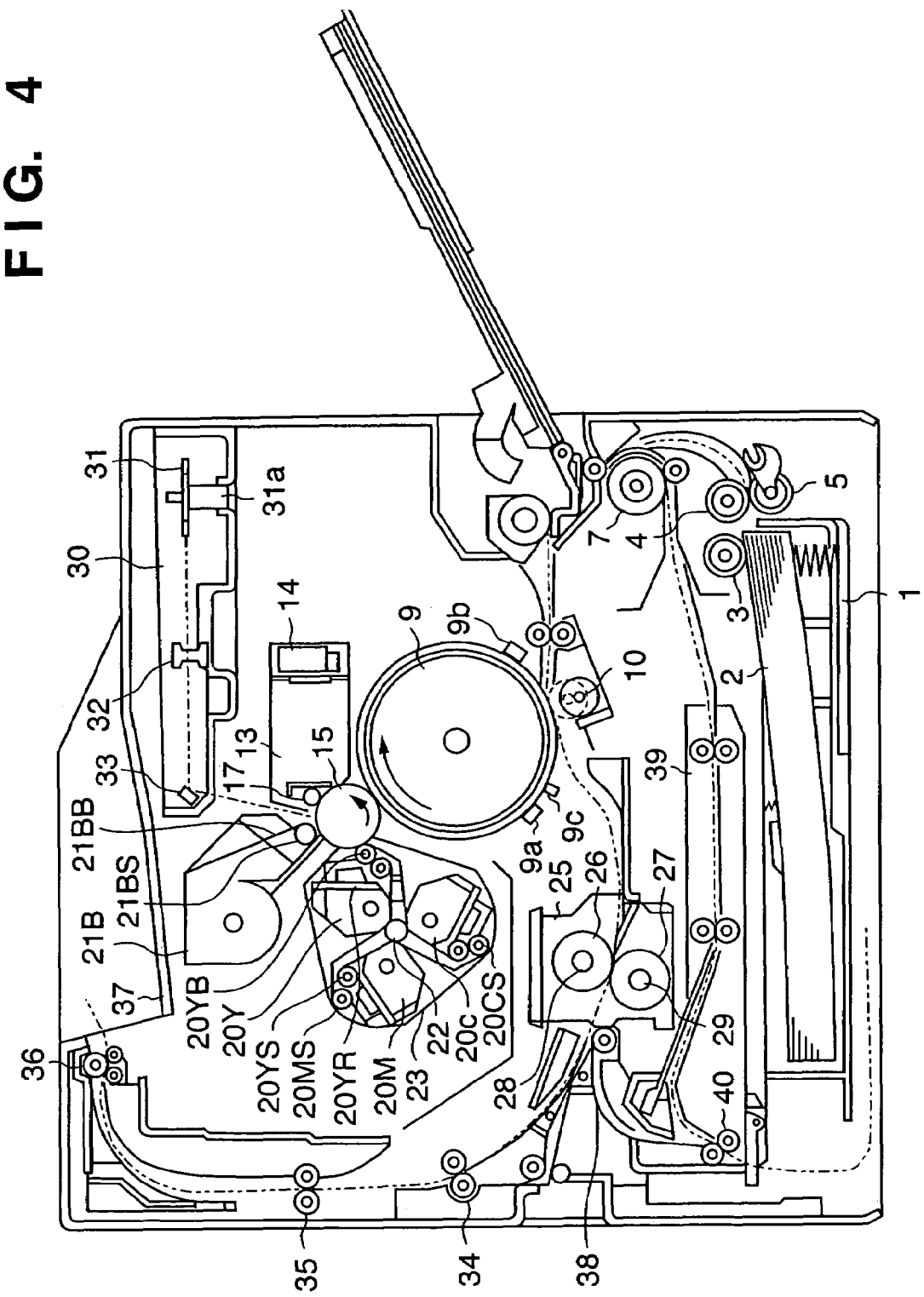
FIG. 4 is a sectional view of a color laser printer with a 2-sided print function in the embodiment.

FIG. 4 is a sectional view of a color laser printer having a 2-sided print function as an example of the printer 1500.

This printer forms an electrostatic latent image by scanning, by a polygonal mirror 31, the surface of a photosensitive drum 15 with a laser beam modulated by image data of each color obtained based on print data input from the host computer 3000. The electrostatic latent image is developed by toner to obtain a visible image, and visible images of all colors are transferred in turn onto an intermediate transfer drum 9 to form a color visible image. The color visible image is transferred onto a transfer medium 2, thus fixing the color visible image on the transfer medium 2. An image forming unit that makes the aforementioned control comprises a drum unit 13 having the photosensitive drum 15, a primary charger having a contact charging roller 17, a cleaning unit, a developing unit, the intermediate transfer drum 9, a paper feed unit including a paper cassette 1 and various rollers 3, 4, 5, and 7, a transfer unit including a transfer roller 10, and a fixing unit 25.

The drum unit 13 integrates the photosensitive drum (photosensitive body) 15 and a cleaner container 14 which has a cleaning mechanism that also serves as a holder of the photosensitive drum 15. The drum unit 13 is detachably supported on a printer main body, and is easily exchanged as a unit in correspondence with the service life of the photosensitive drum 15. The photosensitive drum 15 is prepared by applying an organic photoconductor layer on the outer surface of an aluminum cylinder, and is rotatably supported by the cleaner container 14. The photosensitive drum 15 rotates upon receiving the driving force of a driving motor (not shown), which rotates the photosensitive drum 15 counterclockwise in accordance with image forming operation. An electrostatic latent image is formed by selectively exposing the surface of the photosensitive drum 15. In a scanner unit 30, a modulated laser beam is reflected by the polygonal mirror which rotates by a motor 31a in synchronism with the horizontal sync signal of an image signal, and strikes the photosensitive drum via a lens 32 and reflection mirror 33.

The developing unit comprises three color developers 20Y, 20M, and 20C for developing yellow (Y), magenta (M), and cyan (C) images, and a single black developer 21B for developing a black (B) image. The color developers 20Y, 20M, and 20C and the black developer 21B respectively have sleeves 20YS, 20MS, 20CS, and 21BS, and coating blades 20YB, 20MB, 20CB, and 21BB which are in press contact with the outer surfaces of these sleeves 20YS, 20MS, 20CS, and 21BS. Also, the three color developers 20Y, 20M, and 20C respectively have coating rollers 20YR, 20MR, and 20CR.

The black developer 21B is detachably attached to the printer main body, and the color developers 20Y, 20M, and 20C are detachably attached to a developing rotary 23 which rotates about a rotation shaft 22.

The sleeve 21BS of the black developer 21B is set to have a gap as small as, e.g., 300 μm with respect to the photosensitive drum 15. In the black developer 21B, toner is fed by a feed member built in the developer, and is applied by the coating blade 21BB to the outer surface of the sleeve 21BS which rotates clockwise, thus charging the toner by triboelectrification. By applying a developing bias to the sleeve 21BS, the photosensitive drum 15 undergoes development in accordance with an electrostatic latent image, thus forming a visible image on the photosensitive drum 15 by black toner.

The three color developers 20Y, 20M, and 20C rotate upon rotation of the developing rotary 23 in image formation, and a predetermined one of the sleeves 20YS, 20MS, and 20CS faces the photosensitive drum 15 to have a gap as small as 300 μm. In this manner, a predetermined one of the color developers 20Y, 20M, and 20C stops at the developing position where it faces the photosensitive drum 15, thus forming a visible image on the photosensitive drum 15.

Upon forming a color image, the developing rotary 23 rotates once per rotation of the intermediate transfer drum 9 to execute developing processes in the order of the yellow developer 20Y, magenta developer 20M, cyan developer 20C, and black developer 21B. After four rotations of the intermediate transfer drum 9, visible images are formed in turn by yellow, magenta, cyan, and black toners, thus forming a full-color visible image on the intermediate transfer drum 9.

The intermediate transfer drum 9 contacts the photosensitive drum 15 and rotates upon rotation of the photosensitive drum 15. The drum 9 rotates clockwise upon forming a color image, and four visible images are transferred in turn onto the drum 9 from the photosensitive drum 15. The transfer roller 10 (to be described later) contacts the intermediate transfer drum 9 upon forming an image, and clamps and conveys a transfer medium 2, thus simultaneously transferring a color visible image on the intermediate transfer roller 9 onto the transfer medium 2. A TOP sensor 9a and RS sensor 9b, which are used to detect the position of the intermediate transfer drum 9 in its rotational direction, and a density sensor 9c used to detect the density of the toner image transferred onto the intermediate transfer drum are arranged around the intermediate transfer drum.

The transfer roller 10 comprises a transfer charger which is supported to be movable toward or away from the photosensitive drum 15, and is prepared by winding a middle-resistance foamed elastic member around a metal shaft.

The transfer roller 10 is located at its lower position, as indicated by the solid line in FIG. 4, so as not to disturb color visible images, while color visible images are transferred in turn onto the intermediate transfer drum 9. After the four color visible images are formed on the intermediate transfer drum 9, the transfer roller 10 moves to its upper position indicated by the dotted line in FIG. 1 by a cam member (not shown) in synchronism with the transfer timing of the formed full-color visible image onto the transfer medium 2. In this manner, the transfer roller 10 is brought into press contact with the intermediate transfer drum 9 at a predetermined pressure via the transfer medium 2, and is applied with a bias voltage, thus transferring the full-color visible image on the intermediate transfer drum 9 onto the transfer medium 2.

The fixing unit 25 fixes the transferred full-color visible image while conveying the transfer medium 2, and comprises a fixing roller 26 for heating the transfer medium 2, and a pressing roller 27 for pressing the transfer medium 2 against the fixing roller 26. The fixing roller 26 and pressing roller 27 are formed into a hollow shape, and respectively incorporate heaters 28 and 29. That is, the transfer medium 2 that holds the full-color visible image is conveyed by the fixing roller 26 and pressing roller 27, and the toner image is fixed on its surface by applied heat and pressure.

After the visible image is fixed, the transfer medium 2 is exhausted onto an exhaust unit 37 via exhaust rollers 34, 35, and 36, thus ending the image forming operation.

The cleaning means cleans any residual toner on the photosensitive drum 15 and intermediate transfer drum 9, and waste toner after the toner image formed on the photosensitive drum 15 is transferred onto the intermediate transfer drum 9 or waste toner after the four color visible images formed on the intermediate transfer drum 9 are transferred onto the transfer medium 2 is stored in the cleaner container 14.

The transfer medium (print sheet) 2 which is to undergo a print process is picked up from the paper cassette 1 by the roller 3, and is conveyed while being clamped between the intermediate transfer roller 9 and transfer roller 10 to print a color toner image on it. The toner image is fixed when the transfer medium 2 passes through the fixing unit 25. A guide 38 forms a convey path to guide the print sheet toward the upper exhaust unit in a 1-sided print mode, but forms a path to guide it to a lower 2-side unit in a 2-sided print mode.

The print sheet guided to the 2-side unit is temporarily fed to a portion (a convey path indicated by the two-dashed chain line) below the paper cassette 1 by convey rollers 40, is then conveyed in the reverse direction, and is fed to a 2-side tray 39. On the 2-side tray 39, the paper sheet is upside down to that placed on the paper cassette 1, and its convey direction is reversed. In this state, a toner image is transferred and fixed again, thus achieving the 2-sided print process.

This printer 1500 has an option cassette (not shown) that stores index sheets or inserting sheets as second print media in addition to the aforementioned paper cassette that stores plain print paper sheets as first print media, and executes a print process while selecting a cassette from which paper sheets are to be picked up in accordance with a control instruction from the host computer 3000. With this process, an index sheet fed from the option cassette can be inserted during the print process onto paper sheets fed from the paper cassette 1.

The processing contents of the print control application 304 and print application (despooler) 305 of this embodiment will be described in detail hereinafter using FIGS. 5 to 13.

FIG. 10 shows an example of a setting window associated with a spool file, which is opened by the print control application 304. This setting window can be called from a main window (to be described later). When "change paper" as a division of a chapter is set using a menu 1001 in FIG. 10, an index sheet or inserting sheet fed from the option cassette can be inserted before a new chapter start page.

Figure 8:
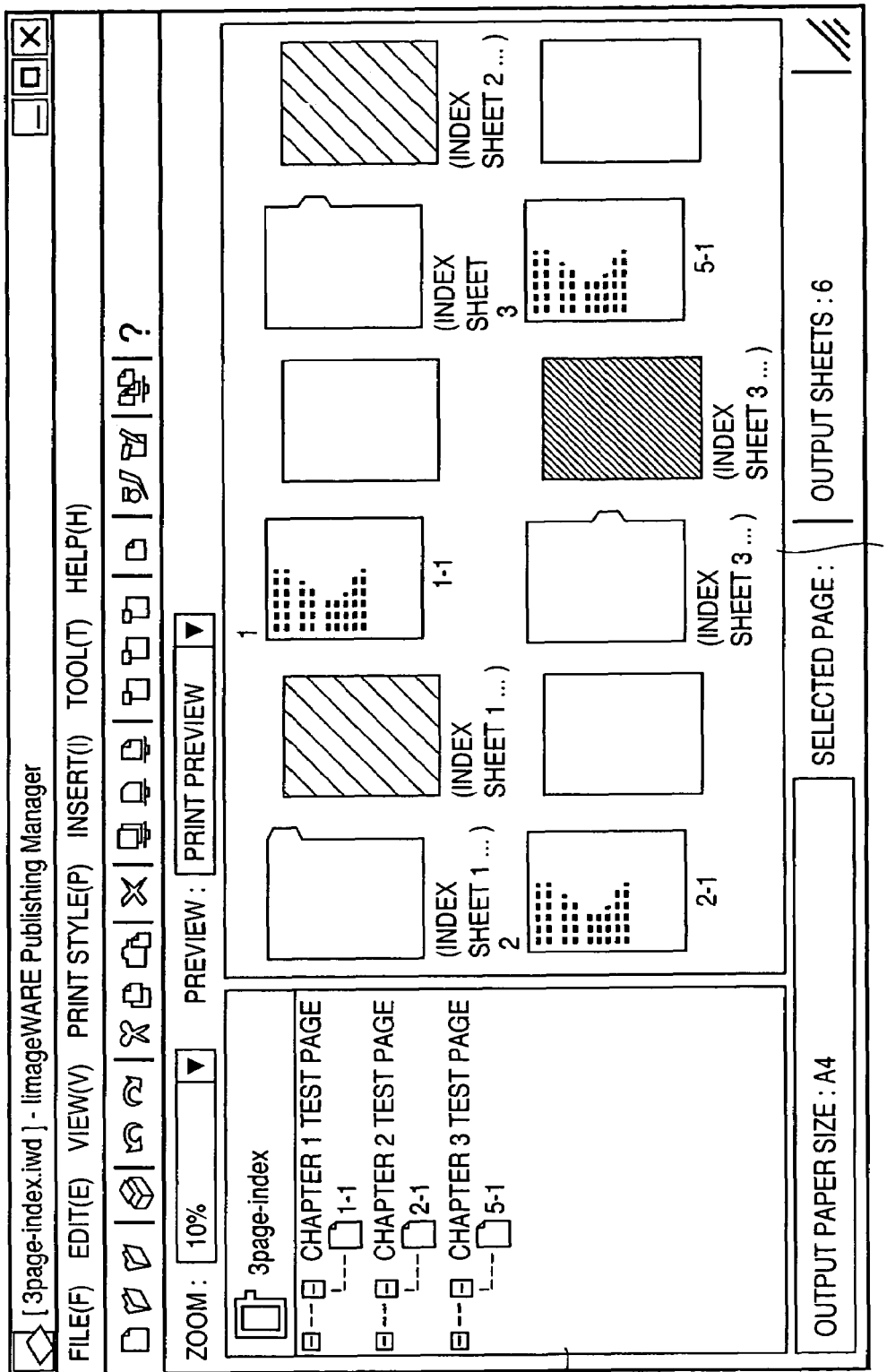
FIG. 8 shows an example of a UI window provided by the print control application in the embodiment.
Figure 9:
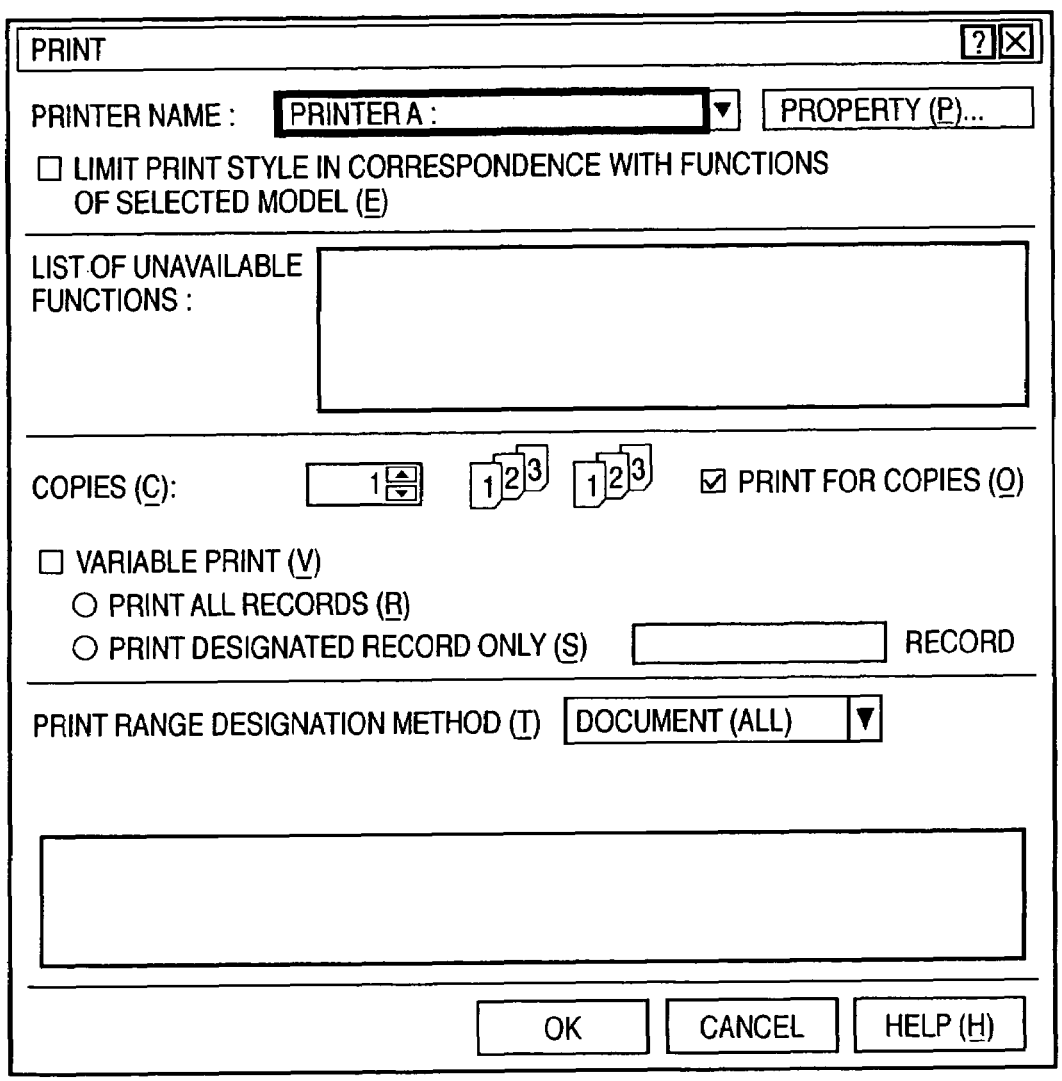
FIG. 9 shows a display example of a print setting UI in the embodiment.

FIG. 8 shows an example of a UI window as a main window provided by the print control application 304.

This UI window includes a tree area 801 that presents the document structure of an opened spool file, and a preview area 802 that displays printed states. The tree area 801 displays chapters included in that spool file and pages included in respective chapters in a tree structure. The tree area 801 displays page numbers, which indicate document page numbers. The preview area 802 displays thumbnails of the contents of print pages. The display order reflects the document structure of the spool file.

For example, when the user sets to insert index sheets at divisions of chapters via the aforementioned setting window shown in FIG. 10, the preview area 802 also displays index sheets at corresponding positions, as shown in FIG. 8.

Figure 5:
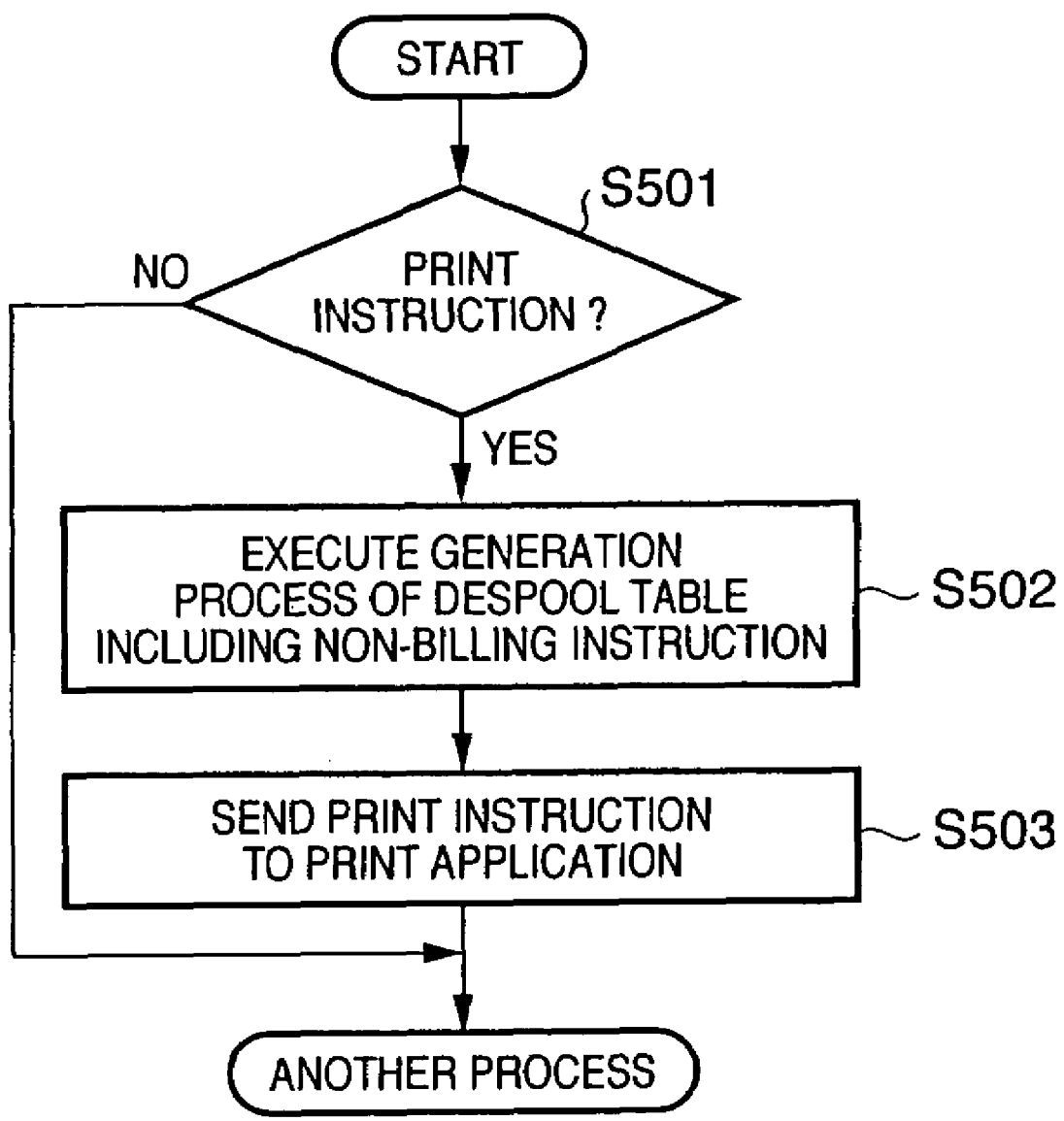
FIG. 5 is a flow chart showing a control process of a print control application in the embodiment.

FIG. 5 is a flow chart showing the control process of the print control application 304 when the user sets to insert index sheets at divisions of chapters.

When the user issues an instruction on the main window shown in FIG. 8, the print control application 304 checks in step S501 if that instruction is a print instruction. The user can call a print setting UI shown in FIG. 9 from the main window. In this case, assume that the user has issued a print instruction from this print setting UI. The flow then advances to step S502 to execute a generation process of a despool table that contains a non-billing instruction. Note that the non-billing instruction instructs not to bill for index sheets.

The despool table is used to designate print information with respect to the print application 305, and has a structure shown in, e.g., FIG. 11. As shown in FIG. 11, the despool table hierarchically describes print setting information associated with a print setup effective for the entire document, that effective for bundle of sheets, that effective for a sheet, and that setup effective for a physical page. In step S502, the despool table with such structure is generated, and non-billing information can be written in that table as a print setup effective for a physical page. When the user sets to insert index sheets at divisions of chapters, non-billing information is written as physical page information of each index sheet. FIG. 12 exemplifies the despool table at that time.

In step S503, a print instruction process from the print control application 304 to the print application (despooler) 305 is executed. In this process, the print control application 304 instructs the print application (despooler) 305 to print in accordance with the contents of the despool table generated in step S502.

The print control process of the print application (despooler) 305 will be described below.

Figure 6:
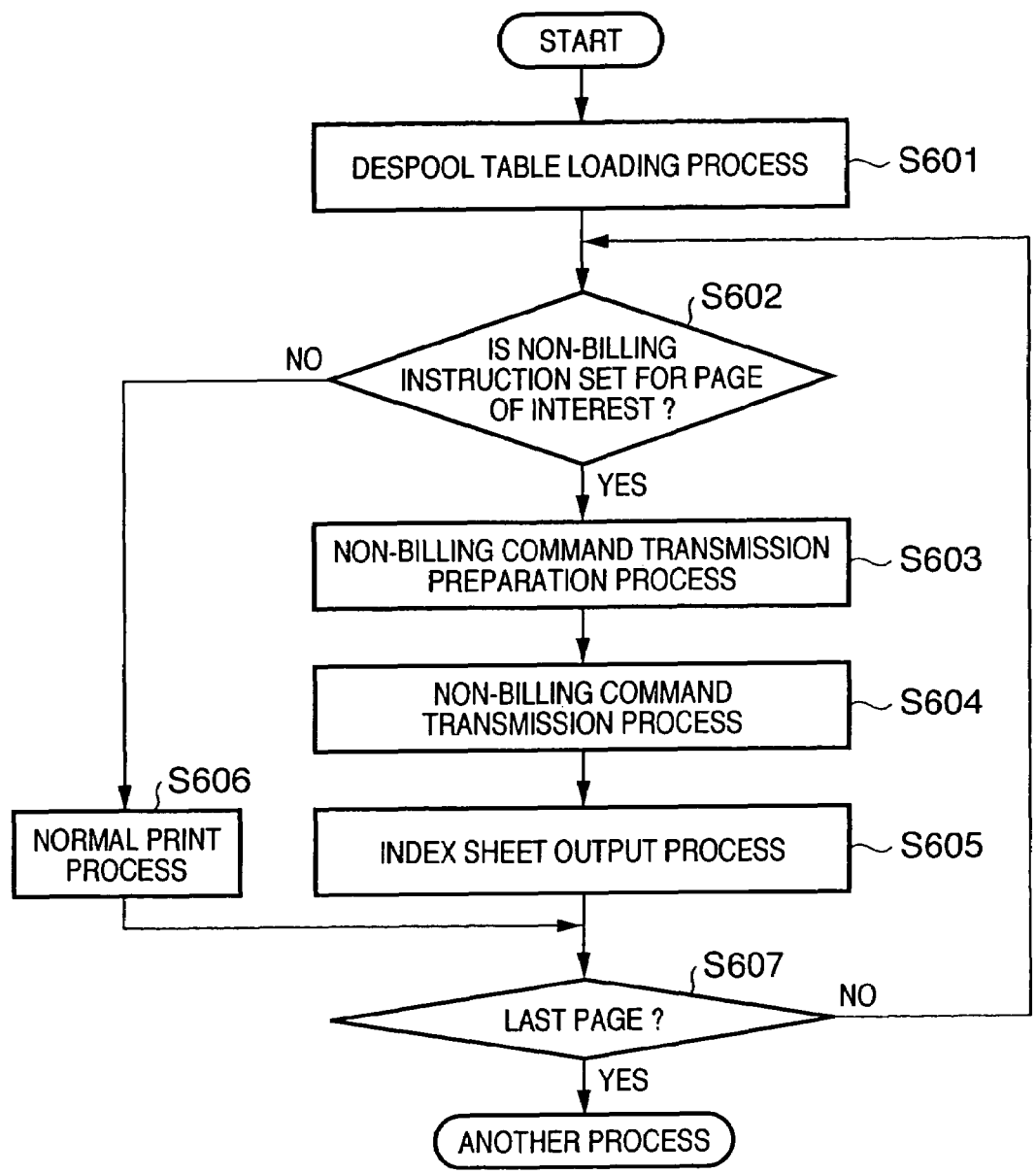
FIG. 6 is a flow chart showing a print control process of a print application (despooler) in the embodiment.
Figure 7:
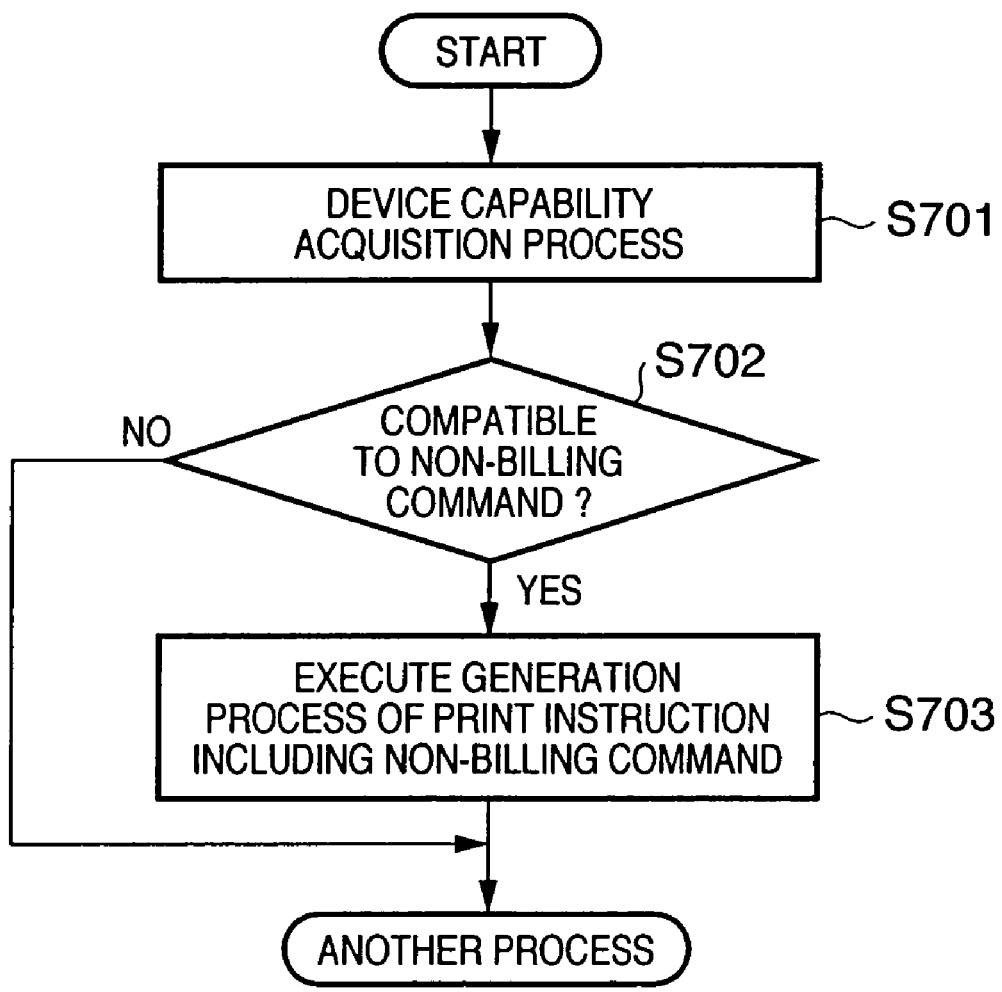
FIG. 7 is a flow chart showing the sequence of a non-billing command transmission preparation process in the embodiment.

FIG. 6 is a flow chart showing the print control process of the print application (despooler) 305.

In step S601, the print application 305 loads the despool table received from the print control application 304. More specifically, the print setup effective for the entire document, that effective for bundle of sheets, that effective for a sheet, and that setup effective for a physical page are loaded in turn.

It is checked in step S602 if the loaded despool table includes a non-billing instruction as the print setup effective for a physical page. If a non-billing instruction is not found, the flow advances to step S606 to execute a normal print process. Upon executing the normal print process, the flow advances to step S607. On the other hand, if the non-billing instruction is found in step S602, the flow advances to step S603 to execute a non-billing command transmission preparation process. More specifically, this process is executed in the sequence shown in FIG. 7.

In step S701, the print application 305 acquires capability information of the printer (device) 1500. Since some printers are incompatible to a non-billing command, the print application 305 inquires the printer 1500 of its capability. This process is executed via the printer driver 203.

The flow advances to step S702, and the print application 305 determines based on the capability data acquired in step S701 if the printer is compatible to a non-billing command. If it is determined in step S702 that the printer is compatible to a non-billing command, the flow advances to step S703.

In step S703, the print application 305 requests a driver SDK (Software Device Kit; not shown) to generate a print setting structure (DEVMODE) that sets a non-billing page. The driver SDK is an application used to define a print setting structure, and generates a print setting structure designated by the print application 305. The print application 305 delivers a GDI function called Reset_DC to the graphic engine 202 (GDI) using the print setting structure generated by the driver SDK as an argument. The graphic engine 202 converts the received GDI function of Reset_DC into a DDI function called Reset_Device, and outputs it to the printer driver 203. The printer driver 203 generates a print instruction using the print setting structure received as an argument of Reset_Device. This print instruction is generated via the printer driver 203 since it depends on the printer. With a series of processes described above, the non-billing command transmission preparation process in step S603 is done. With this process, the printer driver can generate a print instruction by changing the print setting structure (DEVMODE) during the print process.

Next, the printer driver 203 transmits a non-billing command to the printer 1500 in step S604. Upon reception of the non-billing command, the printer 1500 controls the counter not to count up based on that command. In practice, the non-billing command is sent from the printer driver 203 to the printer 1500 via the graphic engine 202. More specifically, the non-billing command is implemented by a PDL command. For example, FIG. 13 shows a LIPS command expansion implementation example. When a parameter that designates to insert an index sheet is set, data which follows that command is printed from the next paper sheet after the index sheet including the current page is inserted. In place of generating the non-billing command as a PDL command shown in FIG. 13, a protocol that defines a print property may be set in a header of print data in a page description language, and that print property field may designate a page number and a non-billing page.

After the command is sent, an index sheet output command is output to insert an index sheet in step S606. This output command is sent to the printer 1500 via the printer driver 203. Since the non-billing command is transmitted before this command, this index sheet is not counted up as a print page on the printer 1500 side.

After that, it is checked in step S607 if the page of interest is the last page. If it is determined in step S607 that the page of interest is not the last page, the flow returns to step S602 to process the next page.

In the above embodiment, data is transmitted from the print application (despooler) 305 to the printer 1500 via the graphic engine 202. Alternatively, data may be transmitted without the intervention of the graphic engine 202. In this case, the non-billing command transmission preparation process in step S603 is omitted, and the print application prompts the printer driver 203 to issue that command in step S604 instead.

According to the above embodiment, a non-billing command is transmitted to the printer side in correspondence with an index sheet, thus excluding the index sheet from sheets to be billed. Note that the above embodiment has exemplified the printer with the 2-sided print function. When a 1-sided print process is made, such 2-sided print function is not required.

The present invention can be similarly applied to a case wherein a blank sheet is inserted to control, e.g., the chapter start page position in the 2-sided print mode, in addition to the middle insert print mode of index sheets. That is, since a blank sheet inserted in such case is also unreasonably billed in the conventional system, the present invention can be similarly applied to solve such problem.

Such embodiment can be sufficiently understood if the above embodiment is read while replacing "index sheet" by "blank sheet". In this case, a blank sheet need not always be fed from the option cassette but can be fed from the paper cassette as usual. On the setting window shown in FIG. 10, "insert blank sheet" at a division of a chapter is set in this case.

ANOTHER EMBODIMENT

The preferred embodiments of the present invention have been explained, and the present invention can be practiced in the forms of a system, apparatus, method, program, storage medium, and the like. Also, the present invention can be applied to either a system constituted by a plurality of devices, or an apparatus consisting of a single equipment.

Note that the present invention includes a case wherein the invention is achieved by directly or remotely supplying a program of software that implements the functions of the aforementioned embodiments to a system or apparatus, and reading out and executing the supplied program code by a computer of that system or apparatus. In this case, software need not have the form of program as long as it has the program function.

Therefore, the program code itself installed in a computer to implement the functional process of the present invention using the computer implements the present invention. That is, the scope of the claims of the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As a recording medium for supplying the program, for example, a flexible disk, hard disk, optical disk, magnetooptical disk, MO, CD-ROM, CD-R, CD-RW, magnetic tape, nonvolatile memory card, ROM, DVD (DVD-ROM, DVD-R), and the like may be used.

As another program supply method, the program may be supplied by establishing connection to a home page on the Internet using a browser on a client computer, and downloading the computer program itself of the present invention or a compressed file containing an automatic installation function from the home page onto a recording medium such as a hard disk or the like. Also, the program code that forms the program of the present invention may be segmented into a plurality of files, which may be downloaded from different home pages. That is, the present invention includes a WWW server which makes a plurality of users download a program file required to implement the functional process of the present invention by the computer.

Also, a storage medium such as a CD-ROM or the like, which stores the encrypted program of the present invention, may be delivered to the user, the user who has cleared a predetermined condition may be allowed to download key information that decrypts the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

The present invention is not limited to the above embodiments and various changes and modifications can be made within the spirit and scope of the present invention. Therefore, to apprise the public of the scope of the present invention, the following claims are made.

What is claimed is:

1. A method of controlling an information processing apparatus which supplies print data to a printer, comprising:
   a generating step of generating print data for printing a document on the printer;
   a determining step of determining whether or not the document includes a page which is not printed by the printer;
   a print setting structure output step of outputting, when it is determined in said determination step that the document includes a page which is not printed by the printer, a print setting structure indicating that the page is not subject to billing to a rendering unit of an OS; and
   a providing step of providing the print data to the printer,
   wherein said generating step generates a non-billing command upon receiving the print setting structure via the rendering unit, and
   wherein said providing step provides the non-billing command to the printer before the printer prints the page of the document, so that the printer does not perform a process relating to billing for the page during printing of the document based on the print data.

2. A method of controlling an information processing apparatus that supplies print data to a printer which comprises a middle insert unit configured to insert index sheet between printed print sheets upon printing and exhausting print sheets, the method comprising:
   a setting step of setting whether or not an index sheet is to be inserted;
   a generating step of generating print data for printing a document on the printer; and
   a providing step of providing the print data to the printer,
   wherein said providing step provides a non-billing command to the printer before processing the index sheet in the printer so that the index sheet is not subject to the billing.

3. The method according to claim 2, further comprising a determining step of determining whether or not the printer is compatible to the non-billing command provided in said providing step.

4. A computer-readable storage medium storing a computer-executable program for making a computer connected to a printer, which comprises a middle insert unit configured to insert an index sheet between printed print sheets upon printing and exhausting print sheets, execute:
   a setting step of setting whether or not an index sheet is to be inserted;
   a generating step of generating print data for printing a document on the printer; and
   a providing step of providing the print data to the printer,
   wherein said providing step provides a non-billing command to the printer before processing the index sheet in the printer so that the index sheet is not subject to the billing.

5. An information processing apparatus that supplies print data to a printer which comprises a middle insert unit configured to insert an index sheet between printed print sheets upon printing and exhausting print sheets, comprising:
   setting means for setting whether or not an index sheet is to be inserted;
   generating means for generating print data for printing a document on the printer; and
   providing means for providing the print data to the printer,
   wherein said providing means provides a non-billing command to the printer before processing the index sheet in the printer so that the index sheet is not subject to the billing.

6. A print system having a printer which comprises a middle insert unit configured to insert index sheet between printed print sheets upon printing and exhausting print sheets, and a host computer connected to said printer,
   said host computer comprising:
      a setting unit configured to set whether or not an index sheet is to be inserted;
      a generating unit configured to generate print data for printing a document on said printer;
      a providing unit configured to provide the print data to said printer; and
      an instructing unit configured to, when said setting unit sets that the index sheet is to be inserted, instruct said printer to exclude the index sheet to be inserted from sheets to be billed when said printer prints the document based on the print data, and
   said printer comprising:
      a printing unit configured to print the document based on the provided print data;
      a counting unit configured to count the number of sheets for the purpose of billing; and
      a controlling unit configured to control a count operation of said counting unit on the basis of an instruction from said instructing unit, so that said counting unit does not count up the number of sheets for the purpose of billing when the index sheet is inserted, and counts up the number of sheets for the purpose of billing when the printed sheet is discharged.

7. A method of controlling an information processing apparatus that supplies print data to a printer which comprises a print unit capable of forming images on two faces of a print sheet and exhausting the printed print sheet, the method comprising:
   a setting step of setting whether or not a blank sheet is to be inserted between printed print sheets;
   a generating step of generating print data for printing a document on the printer; and
   a providing step of providing the print data to the printer,
   wherein said providing step provides a non-billing command to the printer before processing the blank sheet in the printer so that the blank sheet is not subject to the billing.

8. The method according to claim 7, further comprising a determination step of determining whether or not the printer is compatible to the non-billing command provided in said providing step.

9. A computer-readable storage medium storing a computer-executable program for making a computer that supplies print data to a printer, which comprises a print unit capable of forming images on two faces of a print sheet and exhausting the printed print sheet, execute:

a setting step of setting whether or not a blank sheet is to be inserted between printed print sheets;

a generating step of generating print data for printing a document on the printer; and a providing step of providing the print data to the printer, wherein said providing step provides a non-billing command to the printer before processing the blank sheet in the printer so that the blank sheet is not subject to the billing.

10. An information processing apparatus that supplies print data to a printer which comprises a printing unit capable of forming images on two faces of a print sheet and exhausting the printed print sheet, comprising:

a setting unit configured to set whether or not a blank sheet is to be inserted between printed print sheets;

a generating unit configured to generate print data for printing a document on the printer; and a providing step of providing the print data to the printer, wherein said providing unit provides a non-billing command to the printer before processing the blank sheet in the printer so that the blank sheet is not subject to the billing.

11. A print system which has a printer which comprises a print unit capable of forming images on two faces of a print sheet, and a host computer connected to said printer, said host computer comprising:

a setting unit configured to set whether or not a blank sheet is to be inserted between printed print sheets;

a generation unit configured to generate print data for printing a document on said printer;

a providing unit configured to provide the print data to said printer: and an instruction unit configured to, when said setting unit sets that the blank sheet is to be inserted, instructs said printer to exclude the blank sheet to be inserted from sheets to be billed when said printer prints the document based on the print data, and said printer comprising:

a print unit configured to print the document based on the provided print data;

a count unit configured to count the number of sheets for the purpose of billing; and a control unit configured to control a count operation of said count unit on the basis of an instruction from said instruction unit, so that said count unit does not count up the number of sheets for the purpose of billing when the blank sheet is inserted, and counts up the number of sheets for the purpose of billing when the printed sheet is discharged.

12. A printing method for a printer which comprises a middle insert unit configured to insert an index sheet between printed print sheets upon printing and exhausting print sheets, and a host computer connected to said printer, said method composing:

performing by the host computer:

a setting step of setting whether or not an index sheet is to be inserted;

a generating step of generating print data for printing a document on said printer;

a providing step of providing unit configured to provide the print data to said printer; and an instructing step of, when said setting step sets that the index sheet is to be inserted, instructing said printer to exclude the index sheet to be inserted from sheets to be billed when said printer prints the document based on the print data, and performing by the printer:

a printing step of printing the document based on the provided print data;

a counting step of counting the number of sheets for the purpose of billing; and a controlling step of controlling a count operation of said counting step on the basis of an instruction from said instructing step, so that said counting step does not count up the number of sheets for the purpose of billing when the index sheet is inserted, and counts up the number of sheets for the purpose of billing when the printed sheet is discharged.

13. A method for a print system which has a printer which comprises a print unit capable of forming images on two faces of a print sheet, and a host computer connected to said printer, said host computer performing:

a setting step of setting whether or not a blank sheet is to be inserted between printed print sheets;

a generation step of generating print data for printing a document on said printer;

a providing step of providing the print data to said printer; and an instruction step of, when said setting step sets that the blank sheet is to be inserted, instructing said printer to exclude the blank sheet to be inserted from sheets to be billed when said printer prints the document based on the print data, and said printer performing:

a print step of printing the document based on the provided print data;

a count step of counting the number of sheets for the purpose of billing; and a control step of controlling a count operation of said count step on the basis of an instruction from said instruction step, so that said count step does not count up the number of sheets for the purpose of billing when the blank sheet is inserted, and counts up the number of sheets for the purpose of billing when the printed sheet is discharged.

14. A computer-readable storage medium storing a computer-executable program for controlling an information processing apparatus which supplies print data to a printer, said program comprising:

code for a generating step of generating print data for printing a document on the printer;

code for a determining step of determining whether or not the document includes a page which is not printed by the printer; code for a print setting structure output step of outputting, when it is determined in said determination step that the document includes a page which is not printed by the printer, a print setting structure indicating that the page is not subject to billing to a rendering unit of an OS; and code for a providing step of providing the print data to the printer, wherein said generating step generates a non-billing command upon receiving the print setting structure via the rendering unit, and wherein said providing step provides the non-billing command to the printer before the printer prints the page of the document, so that the printer does not perform a process relating to billing for the page during printing of the document based on the print data.

* * * * *